(No Model.)

M. D. TEMPLE.
CHAIN PUMP FIXTURE.

No. 274,409. Patented Mar. 20, 1883.

Witnesses:
Orville C. Rorabaugh
Joseph D. Wilson

Inventor:
Morris D. Temple
By Wm Zimmerman
Atty

UNITED STATES PATENT OFFICE.

MORRIS D. TEMPLE, OF CHICAGO, ILLINOIS.

CHAIN-PUMP FIXTURE.

SPECIFICATION forming part of Letters Patent No. 274,409, dated March 20, 1883.

Application filed February 2, 1882. (No model.)

*To all whom it may concern:*

Be it known that I, MORRIS D. TEMLPE, of Chicago, in the county of Cook and State of Illinois, have made certain new and useful Improvements in Chain-Pump Fixtures; and I hereby declare the following to be a full, clear, and exact description thereof, which will enable others skilled in the art to which my invention relates to make and use the same, reference being had to the accompanying drawings, forming a part hereof, and in which—

Figure 1:
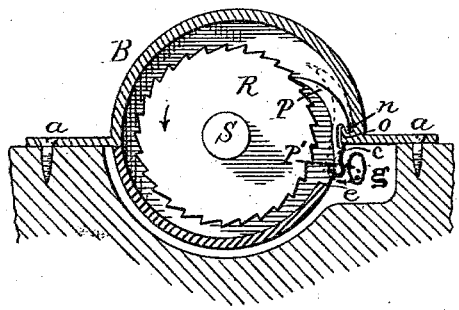
Figure 2:
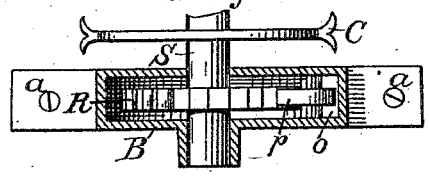
Figure 3:
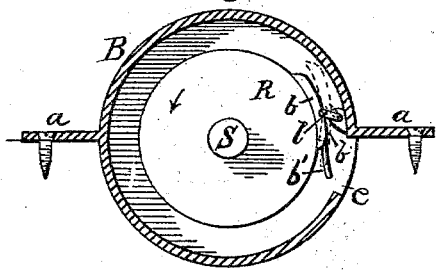

Figure 1 represents a side view in sectional elevation. Fig. 2 represents a plan view of Fig. 1 in section on a plane parallel with the axle S and above the plates $a$. Fig. 3 represents a modification of the same, also shown in sectional elevation.

Like letters of reference indicate like parts.

In the drawings, S represents the shaft of a chain-pump wheel, to which are attached the chain-wheel C, and to one end of the shaft the ratchet or stop-motion wheel R. Said wheel is inclosed and turns freely in a box, B, in the direction indicated by the arrows, and is arrested in case force is applied to it in the reverse direction by the pawl $p$. Said pawl is provided with a spur, $n$, which rests upon the plate $o$, which causes the point of the pawl to rest against the wheel R. The pawl $p$ also has a handle, $p'$, projecting below the plate $o$, which may be pushed inward by reaching through the opening $e$ into the box, and thereby the point of the pawl is released from the ratchet-wheel, as shown in dotted outline.

The shaft-bearing may, as shown, form a part of the box, B, or it may be made separate.

The housing B, constructed for the purpose of guarding the wheel R from water, and consequent ice in winter, thrown upon it from the chain and wheel C, may be made as shown in my previous patent, or as here shown, entirely inclosing the ratchet-wheel, and placed directly on the edge of the curb, which is cut out to receive the box and the plates $a$, attached to its ends. The box may be arranged to open in any way to admit the internal mechanism and placed on either side of the chain-wheel or end of the shaft, preferably that end to which the handle is attached. The plates $a$ and bearings are formed integral with the housing B, but it is obvious that they may be separately attached in any other manner without affecting the nature of the invention thereby. The plates $a$ may be placed upon the side of the housing; but with a housed ratchet it is necessary to have a handle to the pawl or equivalent device, by means of which it may be released from the wheel. A spur, $c$, holds the pawl in its place.

A button, $g$, may be placed near the handle $p'$, as shown, by means of which the pawl may be held back, as shown in the dotted positions.

What I claim is—

1. In chain-pump fixtures, the shaft S, carrying the wheel R, inclosed by housing B, said housing provided with plates $a$ and journal-bearing for shaft S, in combination with a pawl, $p$, inclosed within said housing, substantially as and for the purpose specified.

2. In chain-pump fixtures, the shaft S, carrying the wheel R, inclosed by housing B, said housing provided with plates $a$ and journal-bearing for shaft S, in combination with a pawl, $p$, provided with handle $p'$, inclosed within said housing, substantially as and for the purpose specified.

3. In chain-pump fixtures, the shaft S, carrying the wheel R, inclosed by housing B, said housing provided with plates $a$ and opening $e$, in combination with pawl or stop $p$, provided with handle $p'$, substantially as and for the purpose specified.

4. In chain-pump fixtures, the shaft S, carrying the wheel R, in combination with housing B, provided with plates $a$ and $o$, opening $e$, ratchet $p$, provided with handle $p'$, substantially as and for the purpose specified.

MORRIS D. TEMPLE.

Witnesses:
WM. ZIMMERMAN,
LOUIS KISTLER.